Jan. 6, 1959  G. A. LYON  2,867,477
WHEEL COVER
Filed Dec. 13, 1955
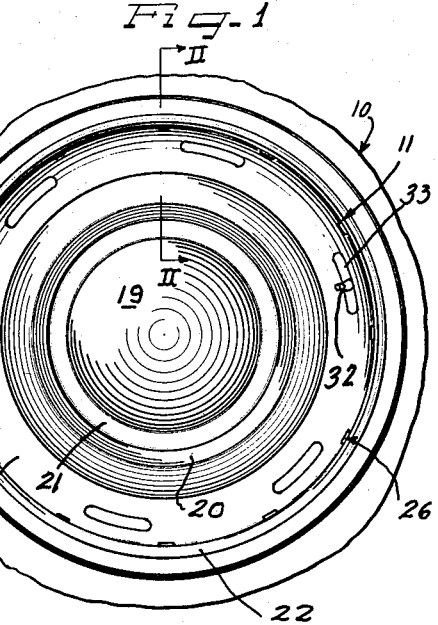
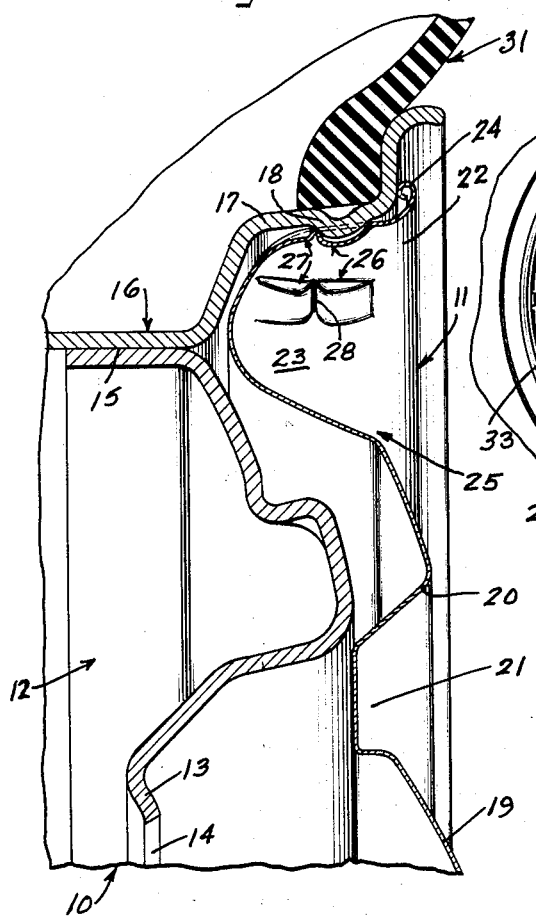
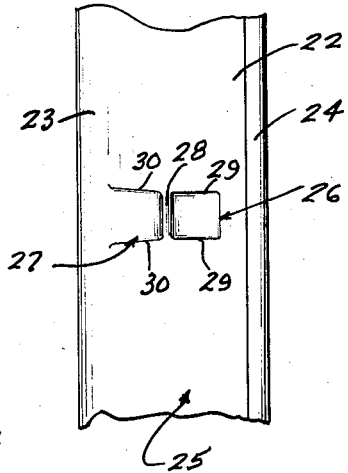
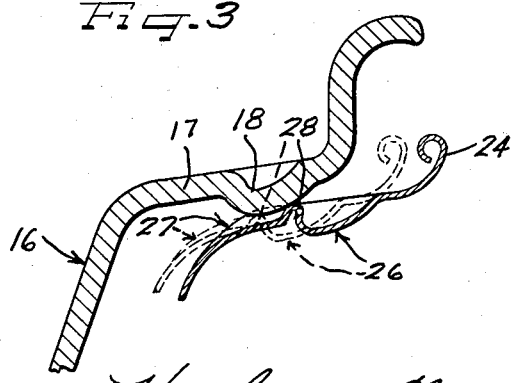
Inventor
GEORGE ALBERT LYON

United States Patent Office 2,867,477
Patented Jan. 6, 1959

2,867,477

WHEEL COVER

George Albert Lyon, Detroit, Mich.

Application December 13, 1955, Serial No. 552,793

15 Claims. (Cl. 301—37)

This invention relates generally to a wheel structure and more particularly to a new ornamental and protective wheel cover construction. More particularly this invention relates to a wheel cover having new and improved means for retaining the cover upon the wheel.

More particularly the instant invention relates to an improved cover construction wherein axially aligned inner and outer pockets or recesses have been provided and which are separated from one another by a resilient edge. This cover construction has been found to be highly advantageous since the aforementioned edge is adapted to retainingly engage behind protuberances to maintain the cover upon the wheel. In addition, the axially inner recess serves to aid in the proper alignment of the axially outer recess with respect to the protuberances. It is in this manner that blind assembly of the axially outer recess on the associated protuberances may be very readily attained.

Accordingly, it is an object of this invention to provide a new and improved cover construction.

Another object of this invention is to provide a cover having new and improved means for retaining the cover upon the wheel.

Still another object of this invention is to provide a new and improved cover construction having means capable of assisting in the proper alignment of the retaining means on a vehicle wheel.

Yet another object of this invention is to provide a new and improved cover construction which lends itself to economical manufacture on a large production basis.

According to the general features of this invention there is provided in a wheel structure, a wheel including tire rim and body parts one of which has generally radially extending spaced protuberances disposed generally in a common circle about the axis of the wheel, and a metallic circular cover member having an outer marginal edge portion merging into a dished curved inner portion with shoulder means at the junction of the portions, the outer portion having offset recesses on the axially outer side of the cover adapted to register with said wheel protuberances, each recess being defined on one of its sides by the shoulder means, the shoulder means being disposed in a circle common to all the recesses and being resiliently deflectable radially when pressed against the wheel protuberances for entry of the protuberances into the recesses to retain the cover on the wheel and against turning, and lead-in guide means on the cover in axial alignment with at least one of the recesses to aid in the axial alignment of the offset recess with respect to the associated protuberances.

Another feature of this invention relates to the provision of pressed out axially aligned recesses or pockets having a resilient gripping edge separating the pockets and defining in each case one of the side walls of the pockets.

A further feature of this invention relates to providing an ornamental and protective cover construction for disposition on the outer side of a vehicle wheel.

Yet another feature of this invention relates to providing a plurality of circumferentially spaced slots in the cover capable of receiving a valve stem whereby various groups of retaining recesses or bump-engaging sockets may be utilized to retain the cover upon the bumps should any of same become damaged.

Other objects and features of the present invention will become apparent from the following detailed description taken in connection with the accompanying drawing illustrating a single embodiment in which:

Figure 1 is a side elevational view of my novel wheel structure embodying features of the present invention;

Figure 2 is an enlarged fragmentary cross sectional view taken substantially on the line II—II of Figure 1 looking in the direction indicated by the arrows:

Figure 3 is a fragmentary sectional view similar to Figure 2 showing the cover in the process of being aligned and placed over the bumps on the wheel; and Figure 4 is an enlarged fragmentary edge elevation of the cover showing one of the bump-engaging sockets and lead-in ramp portions of the cover.

As shown on the drawing:

The reference numeral 10 indicates generally my novel wheel structure which includes a cover 11 adapted for overlying disposition upon the wheel.

The cover 11 may be made out of any suitable material such as sheet metal, for example, stainless steel strip.

The wheel 10 includes a central body part 12 having an attachment flange 13 provided with an opening 14 which is adapted to receive therethrough in a conventional manner lugs carried by a vehicle wheel axle (not shown) whereby nuts may be attached on the end of the lugs to maintain the body part 12 and wheel 10 upon the vehicle.

Suitably connected to the body part 12 at 15 is a more or less conventional drop center type tire rim 16 including an axial flange 17 having circumferentially spaced pressed out generally radially extending bumps or protuberances 18.

For the purposes of the present invention which will more fully hereinafter become apparent it will be appreciated that the instant cover construction 11 may suitably comprise a full wheel disk, a trim ring construction, or a hub or body member engaging cover member such as a hub cap.

In the illustrated exemplary cover construction shown in the drawings, it will be noted that the cover 11 has a central crown 19 which is separated from an annular rib 20 by a dished portion 21. The rib 20 is separated from an outer cover margin 22 by a dished intermediate portion 23, with the outer margin 22 having a curled terminal pry-off bead 24 to aid in the removal of the cover.

Disposed radially inwardly of the outer beaded edge 24 is a generally axially inwardly extending annular flange portion 25. Carried on the flange portion 25 at circumferentially spaced intervals are a plurality of pressed out recesses or indentations or pockets 26. In axial alignment with each of the recesses 26 immediately adjacent thereto is a second recess or indentation or pocket 27. Separating the recesses 26 and 27 is a resilient edge or edge area or shoulder or shoulder area 28 which is adapted to retainingly engage behind bumps 18 when the cover is assembled upon the wheel 10. The recesses 27 may also be identified as lead-in ramps, the function of which will hereinafter become apparent.

It will be noted that each of the recesses 26 and 27 have circumferentially spaced edges 29 and 30 respectively (Figure 4). The edges 29 on recess or pocket 26 are adapted to grip on circumferentially opposite or spaced sides of bumps 18 so as to positively insure relative co-rotation of the cover when mounted upon the wheel.

The edges 30 on recess or pocket or ramp 27 are utilized as guides in the assembly of the cover upon the wheel to insure that the bumps 18 have been properly axially aligned with respect to the pockets 26 prior to the application of pressure which results in the edge 28 being retainingly engaged behind bump 18. It will be noted that these edges are flared slightly to provide a larger mouth to receive the associated bump 18.

In the illustrated embodiment it will be noted that the bead 24 is shown to be bottomed upon the tire rim when the edges 28 are fully engaged behind the bumps 18. By so doing, a more or less cushioned engagement may be effected between the cover and wheel.

From Figure 1 it will be apparent that relatively large numbers of recesses 26 and 27 have been provided on the cover, which recesses tend to ornament same. While the number of bumps 18 utilized numbers preferably four, it will be appreciated that different combinations may be employed.

Carried upon the tire rim 16 is a more or less conventional tire assembly 31 which may be either of the tube or tubeless type and which includes a valve stem 32 for inflating the tire.

In the preferred or illustrated form of my invention it will be noted that the valve stem 32 is adapted to extend generally radially outwardly through generally arcuate circumferentially spaced elongated slots 33. While it is within the scope of the present invention that a more or less conventional type opening may be provided on the wheel cover 11 to receive the valve stem 33, highly advantageous results accrue as a result of employing elongated slots 33.

To this end, the slots 33 aid in the cooling of the brake drum by allowing air which is directed into the dished cover portion 23 to be projected through the slots 33 through wheel openings (not shown) on and adjacent to the brake drum structure (not shown).

These slots 33 also serve a further advantageous function in that the cover may take any number of assembled positions on the wheel depending on which group of the recesses 26 is intended to retainingly cooperate with the bumps 18. In view of the foregoing, it will be apparent that should any one or two or more of the pockets or recesses 26 and 27 become damaged, for example, the edge 28 becoming slightly sprung, the cover may be rotated to a new position with the valve stem 32 extending through another of slots 33 with the result that a new combination or group of the recesses 26 will be capable of retained engagement upon the same bumps 18.

In the assembly of the cover upon the wheel, one of slots 33 is initially aligned with respect to the valve stem 32 with the cover being moved axially inwardly so that the stem 32 extends through the cover. At this point, the cover may be gripped by both hands and rotated circumferentially until the bumps 18 are engaged in lead-in ramp or recess 27 between the flared edges 30—30. When the bump 18 is engaged in leadin ramp 27, the person assembling the cover will immediately recognize this fact, since the bump 18 will tend to produce a clicking sound as it is moved against spaced edges 30—30 defining the ramp 27.

After the ramp 27 has been axially aligned and engaged with bumps 18, upon the application of an axially inward force, the edges 28 separating the recesses 26 and 27 may be sprung and resiliently engaged over and behind bumps 18 to retainingly maintain the cover upon the wheel. When the cover is in assembly with the wheel, the edges 29 of the pockets 26 engage on circumferentially spaced sides of the bumps 18 to insure co-rotation of the cover on the wheel.

If a conventional single valve slot is utilized rather than the arcuate slots 33, the ramps 27 will serve the same function as here illustrated since ordinarily there is a slight amount of play between the single slot and the valve stem 32 whereby the cover may be rotated in order that the ramp will become fully engaged over bumps 18.

The principal or essential factors in providing centering means for the recesses 26 resides in providing circumferentially spaced edges 30 which may be flared, between which the bumps 18 may be guided into the axially outer recesses 26.

Removal of the cover from the wheel may be brought about by inserting a suitable pry-off tool underneath the pry-off bead 24 and upon the application of a suitable pry-off force, the edges 28 may be disengaged from behind the bumps 18.

It will be understood that modifications and variations may be effected without departing from the scope of the novel concepts of the present invention.

I claim as my invention:

1. In a wheel structure, a wheel including tire rim and body parts one of which has generally radially extending spaced protuberances disposed generally in a common circle about the axis of the wheel, and a metallic circular cover member having an outer marginal edge portion merging into a dished curved inner portion with shoulder means at the junction of said portions, said outer portion having offset structure providing recesses on the axially outer side of the cover adapted to register with said wheel protuberances, each recess being defined on one of its sides by said shoulder means, said shoulder means being disposed in a circle, common to all said recesses and being resiliently deflectable radially when pressed against said wheel protuberances for entry of said protuberances into said recesses to retain the cover on the wheel and against turning, and lead-in guide means on said cover in axial alignment with at least one of said recesses to aid in the axial alignment of said recess with respect to the associated protuberances, said lead-in guide means including circumferentially spaced pairs of axially inwardly diverging edges with the edges in each of the pairs being spaced circumferentially of one another.

2. In a wheel structure, a wheel including tire rim and body parts one of which has generally radially extending spaced protuberances disposed generally in a common circle about the axis of the wheel, and a metallic circular cover member having an outer marginal edge portion merging into a dished curved inner portion with shoulder means at the junction of said portions, said outer portion having recesses on the axially outer side of the cover adapted to register with said wheel protuberances, each recess being defined on one of its sides by said shoulder means, said shoulder means being disposed in a circle, common to all said recesses and being resiliently deflectable radially when pressed against said wheel protuberances for entry of said protuberances into said recesses to retain the cover on the wheel and against turning, lead-in guide means on said cover in axial alignment with at least one of said recesses to aid in the axial alignment of said recess with respect to the associated protuberances, and said wheel having a valve stem and at least one elongated slot on said cover in registry with said valve stem to permit a limited amount of adjustment of said stem in said slot, said recesses being in excess of the number of the protuberances enabling different sets of recesses to cooperate with the protuberances in case one or more of the recesses in one set are damaged.

3. In a wheel structure, a wheel including tire rim and body parts one of which has generally radially extending spaced protuberances disposed generally in a common circle about the axis of the wheel, and a metallic circular cover member having an outer marginal edge portion merging into a dished curved inner portion with shoulder means at the junction of said portions, said outer portion having recesses on the axially outer side of the cover adapted to register with said wheel protuberances, each recess being defined on one of its sides by said shoulder means, said shoulder means being disposed in a circle, common to all said recesses and being resiliently deflectable radially when pressed against said wheel protuberances for entry of said protuberances into said recesses to retain the cover on the wheel and against turning, and lead-in guide means on said cover in axial alignment with at least one of said recesses to aid in the axial alignment of said recess with respect to the associated protuberances, said lead-in guide means comprising radially indented cover areas defining recesses in said cover.

4. In a wheel structure, a wheel including tire rim and body parts one of which has generally radially extending spaced protuberances disposed generally in a common circle about the axis of the wheel, and a circular cover member having an outer marginal edge portion and shoulder means positioned generally radially inwardly of said edge portion, recesses on the axially outer side of the cover between said edge portion and said shoulder means adapted to register with said wheel protuberances, each recess being defined on one of its sides by said shoulder means, said shoulder means being disposed in a circle, common to all said recesses and being resiliently deflectable radially when pressed against said wheel protuberances for entry of said protuberances into said recesses to retain the cover on the wheel and against turning, and lead-in guide means on said cover in axial alignment with at least one of said recesses to aid in the axial alignment of said recess with respect to the associated protuberances, said lead-in guide means including circumferentially spaced pairs of axially inwardly diverging edges with the area between the edges in each pair indented radially inwardly.

5. In a wheel structure, a wheel including tire rim and body parts one of which has generally radially extending spaced protuberances disposed generally in a common circle about the axis of the wheel, and a circular cover member having an outer marginal edge portion and shoulder means positioned generally radially inwardly of said edge portion, recesses on axially outer sides of the cover between said edge portion and said shoulder means adapted to register with said wheel protuberances, each recess being defined on one of its sides by said shoulder means, said shoulder means being disposed in a circle, common to all said recesses and being resiliently deflectable radially when pressed against said wheel protuberances for entry of said protuberances into said recesses to retain the cover on the wheel and against turning, lead-in guide means on said cover in axial alignment with at least one of said recesses to aid in the axial alignment of said recess with respect to the associated protuberances, and said wheel having a valve stem and at least one elongated slot on said cover in registry with said valve stem to permit a limited amount of adjustment of said stem in said slot, said recesses being in excess of the number of the protuberances enabling different sets of recesses to cooperate with the protuberances in case one or more of the recesses in one set are damaged.

6. In a wheel structure, a wheel including tire rim and body parts one of which has generally radially extending spaced protuberances disposed generally in a common circle about the axis of the wheel, and a circular cover member having an outer marginal edge portion and shoulder means positioned generally radially inwardly of said edge portion, recesses on the axially outer side of the cover between said edge portion and said shoulder means adapted to register with said wheel protuberances, each recess being defined on one of its sides by said shoulder means, said shoulder means being disposed in a circle, common to all said recesses and being resiliently deflectable radially when pressed against said wheel protuberances for entry of said protuberances into said recesses to retain the cover on the wheel and against turning, and lead-in guide means on said cover in axial alignment with at least one of said recesses to aid in the axial alignment of said recess with respect to the associated protuberances, said lead-in guide means comprising radially indented cover areas defining recesses in said cover.

7. In a wheel structure, a wheel including tire rim and body parts one of which has generally radially extending spaced protuberances disposed generally in a common circle about the axis of the wheel, and a circular cover member including an annular dished area and having an outer marginal edge portion and shoulder means positioned generally radially inward of said edge portion on said annular dished area, recessed areas defining radially opening recesses on the axially outer side of the cover between said edge portion and said shoulder means for receipt of said protuberances and each recess being defined on one of its sides by said shoulder means, said shoulder means being disposed in a circle common to all said recesses and being resiliently deflectable radially when pressed against said wheel protuberances for entry of said protuberances in recesses to retain the cover on the wheel and against turning, said shoulder means comprising circumferentially spaced edges for bottoming on the wheel axially inwardly and radially behind said protuberances.

8. In a wheel structure, including rim and body parts with one of the parts having circumferentially spaced bumps, a wheel cover for overlying disposition upon the wheel having a cover portion opposed to said bumps, said cover portion having circumferentially spaced sets of pressed out generally axially inner and outer recesses with each set of recesses separated by a resilient gripping edge which are arranged in a common circle, said axially inner recess adapted to aid in the alignment of said axially outer recess with the associated bump whereby when said inner recesses are engaged with said bumps and upon a further application of pressure, the resilient edges may be flexed over and detachably engaged and retained behind each of the associated bumps.

9. In a wheel structure, including rim and body parts with one of the parts having circumferentially spaced bumps, a wheel cover for overlying disposition upon the wheel having a cover portion opposed to said bumps, said cover portion having circumferentially spaced sets of pressed out generally axially inner and outer recesses with each set of recesses separated by a resilient gripping edge which are arranged in a common circle, said axially inner recess adapted to aid in the alignment of said axially outer recess with the associated bump whereby when said inner recesses are engaged with said bumps and upon a further application of pressure, the resilient edges may be flexed over and detachably engaged and retained behind each of the associated bumps, and each of said bumps being interlocked in said axially outer recess to insure co-rotation of the cover when assembled on the wheel.

10. In a wheel structure, including rim and body parts with one of said parts having circumferentially spaced rigid bumps, a wheel cover for overlying disposition upon the wheels having a cover portion provided with circumferentially spaced pockets with each of said pockets having on one side a gripping edge arranged in a common circle, and each adapted to retainingly engage behind one of said bumps, and lead-in sets of spaced guide edges axially inward of each of said pockets to receive therebetween one of said bumps to assist in alignment of said pockets with the associated bumps.

11. In a wheel structure, including rim and body parts with one of said parts having circumferentially spaced rigid bumps, a wheel cover for overlying disposition upon the wheel having a cover portion provided with circumferentially spaced pockets with each of said pockets having on one side a gripping edge arranged in a common circle, and each adapted to retainingly engage behind one of said bumps, and lead-in sets of spaced guide edges axially inward of each of said pockets to receive therebetween one of said bumps to assist in alignment of said pockets with the associated bumps, said edges of each of said sets of edges being flared to provide an enlarged mouth thereby aiding in the assembly of said bumps in said pockets.

12. In a wheel structure, including rim and body parts with one of said parts having circumferentially spaced bumps and with said rim having a valve stem extending outwardly therefrom, a wheel cover for overlying disposition upon the wheel having a cover portion provided with circumferentially spaced pockets with each of said pockets having on one side a gripping edge arranged in a common circle and adapted to retainingly engage behind one of said bumps, lead-in sets of spaced guide edges generally axially inward of each of said pockets to receive therebetween one of said bumps to assist in alignment of said pockets with the associated bump, said pockets being in excess of the number of said bumps, and circumferentially spaced air circulating slots on said cover arranged in a common circle each of which is adapted to receive therethrough said valve stem, whereby said cover may be rotated with different groups of pockets retainingly engaged with said bumps in case the gripping edges or pockets in one of the groups are damaged.

13. In a wheel structure including rim and body parts with one of the parts having circumferentially spaced bumps and with the rim having a valve stem extending outwardly therefrom, a wheel cover for overlying disposition upon the wheel having a cover portion provided with circumferentially spaced sockets with said sockets each having on one side a gripping edge adapted to retainingly engage behind one of said bumps, said sockets being in excess of the number of the bumps, and circumferentially spaced air circulating slots on the cover arranged in a common circle each of which is adapted to receive therethrough the valve stem, whereby the cover may be rotated with different groups of sockets retainingly engaged with the bumps in case of damage to said gripping edge.

14. In a wheel structure including rim and body parts with one of the parts having circumferentially spaced bumps and with the rim having a valve stem extending outwardly therefrom, a wheel cover for overlying disposition upon the wheel having a cover portion provided with circumferentially spaced sockets with said sockets each having on one side a gripping edge adapted to retainingly engage behind one of said bumps, said sockets being in excess of the number of the bumps, circumferentially spaced air circulating slots on the cover arranged in a common circle each of which is adapted to receive therethrough the valve stem, whereby the cover may be rotated with different groups of sockets retainingly engaged with the bumps in case of damage to said gripping edge, and circumferentially spaced lead-in radially pressed-out bulges in axial alignment with said sockets defining radially and axially opening ramp recesses for receipt of said bumps to aid in the centering and guiding of the bumps behind the edges in the sockets.

15. In a wheel structure, a wheel including tire rim and body parts, one of which has generally radially extending spaced protuberances disposed generally in a common circle about the axis of the wheel, and a circular cover member having an outer marginal edge portion and shoulder means positioned generally radially inwardly of said edge portion, offset recessed areas on the axially outer side of the cover between said edge portion and said shoulder means adapted to register with said wheel protuberances, each recessed area being defined on one of its sides by said shoulder means, said shoulder means being disposed in a circle, common to all said recessed areas and against said wheel protuberances for entry of said protuberances in said recessed areas to retain the cover on the wheel against turning, and a second set of radially offset recessed areas on the cover with each of the radially offset recessed areas disposed in axially adjacent relation to one of said offset recessed areas separated from one another by said shoulder means and with said radially offset recessed areas having a slightly wider circumferential dimension than said offset recessed areas disposed axially outwardly thereof to facilitate assembly of the cover with the protuberances.

References Cited in the file of this patent

UNITED STATES PATENTS

| | | |
|---|---|---|
| 2,022,174 | Allee | Nov. 26, 1935 |
| 2,148,995 | Nelson | Feb. 28, 1939 |
| 2,631,066 | Horn | Mar. 10, 1953 |
| 2,669,487 | Horn | Feb. 16, 1954 |
| 2,675,040 | Raun et al. | Apr. 13, 1954 |
| 2,731,301 | Lyon | Jan. 17, 1956 |